United States Patent
Stolte et al.

(10) Patent No.: US 8,569,906 B2
(45) Date of Patent: Oct. 29, 2013

(54) ENERGY SUPPLY SYSTEM FOR SUPPLYING ENERGY TO AIRCRAFT SYSTEMS

(75) Inventors: Ralf-Henning Stolte, Hamburg (DE);
Harald Gründel, Hamburg (DE)

(73) Assignee: Airbus Operations GmbH (DE)

( * ) Notice: Subject to any disclaimer, the term of this patent is extended or adjusted under 35 U.S.C. 154(b) by 443 days.

(21) Appl. No.: 11/992,344

(22) PCT Filed: Sep. 27, 2006

(86) PCT No.: PCT/EP2006/009398
§ 371 (c)(1),
(2), (4) Date: Oct. 7, 2009

(87) PCT Pub. No.: WO2007/039211
PCT Pub. Date: Apr. 12, 2007

(65) Prior Publication Data
US 2010/0019568 A1    Jan. 28, 2010

Related U.S. Application Data

(60) Provisional application No. 60/721,638, filed on Sep. 29, 2005.

(30) Foreign Application Priority Data

Sep. 29, 2005    (DE) ................... 10 2005 046 729

(51) Int. Cl.
*H02J 11/00* (2006.01)
*H02J 15/00* (2006.01)

(52) U.S. Cl.
USPC ........................................... 307/9.1

(58) Field of Classification Search
USPC ....................... 307/9.1, 10.1, 132 E
See application file for complete search history.

(56) References Cited

U.S. PATENT DOCUMENTS

| | | | |
|---|---|---|---|
| 6,188,591 B1 | 2/2001 | Ruter et al. | |
| 6,256,977 B1 * | 7/2001 | McGinley et al. | 60/786 |
| 6,296,957 B1 | 10/2001 | Graage | |
| 6,593,671 B1 | 7/2003 | Schell | |
| 6,641,084 B1 | 11/2003 | Huber et al. | |
| 6,709,362 B2 * | 3/2004 | Tomohiro et al. | 477/3 |
| 6,764,785 B2 * | 7/2004 | Colborn et al. | 429/430 |

(Continued)

FOREIGN PATENT DOCUMENTS

| | | |
|---|---|---|
| DE | 198 21 952 C2 | 11/1999 |
| DE | 19932781 A1 | 12/1999 |

(Continued)

OTHER PUBLICATIONS

International Search Report issued on Nov. 29, 2006 in connection with corresponding International Application No. PCT/EP2006/009398.

*Primary Examiner* — Adi Amrany
(74) *Attorney, Agent, or Firm* — Lerner, David, Littenberg, Krumholz & Mentlik, LLP

(57) ABSTRACT

An energy supply system for an aircraft comprises at least one fuel cell and at least one energy storage device, wherein the fuel cell, of which there is at least one, is coupled to the energy storage device, of which there is at least one, such that the energy storage device can be charged by means of the fuel cell.

11 Claims, 1 Drawing Sheet

(56) References Cited

U.S. PATENT DOCUMENTS

| | | | |
|---|---|---|---|
| 6,953,100 B2 * | 10/2005 | Aberle et al. | 429/432 |
| 7,028,795 B2 * | 4/2006 | Tabata | 180/65.21 |
| 7,117,683 B2 * | 10/2006 | Thompson | 60/786 |
| 7,210,653 B2 * | 5/2007 | Atkey et al. | 244/58 |
| 7,273,120 B2 * | 9/2007 | Tabata | 180/65.265 |
| 7,405,013 B2 * | 7/2008 | Yang et al. | 429/421 |
| 7,576,512 B2 * | 8/2009 | Kikuchi et al. | 320/100 |
| 7,701,082 B2 * | 4/2010 | Lazarovich et al. | 307/22 |
| 7,866,425 B2 * | 1/2011 | King et al. | 180/65.31 |
| 2002/0047270 A1 * | 4/2002 | Graage et al. | 290/40 B |
| 2002/0064695 A1 * | 5/2002 | Raiser | 429/13 |
| 2002/0109406 A1 * | 8/2002 | Aberle et al. | 307/10.1 |
| 2002/0136939 A1 * | 9/2002 | Grieve et al. | 429/23 |
| 2003/0075643 A1 | 4/2003 | Dunn | |
| 2003/0080622 A1 * | 5/2003 | Koenig | 307/64 |
| 2003/0148850 A1 * | 8/2003 | Tomohiro et al. | 477/3 |
| 2003/0155464 A1 * | 8/2003 | Tseng | 244/58 |
| 2003/0230671 A1 * | 12/2003 | Dunn | 244/53 R |
| 2004/0070372 A1 * | 4/2004 | Kawai et al. | 322/7 |
| 2004/0129835 A1 * | 7/2004 | Atkey et al. | 244/118.5 |
| 2004/0155526 A1 * | 8/2004 | Naden et al. | 307/43 |
| 2004/0159480 A1 | 8/2004 | Ishikawa et al. | |
| 2004/0178679 A1 * | 9/2004 | Kabasawa | 307/10.1 |
| 2005/0008904 A1 * | 1/2005 | Suppes | 429/9 |
| 2005/0284676 A1 * | 12/2005 | King et al. | 180/65.3 |
| 2006/0066108 A1 * | 3/2006 | Willets et al. | 290/10 |
| 2006/0076831 A1 * | 4/2006 | Meyers et al. | 307/10.1 |
| 2006/0113129 A1 * | 6/2006 | Tabata | 180/65.2 |

FOREIGN PATENT DOCUMENTS

| | | |
|---|---|---|
| DE | 103 60 303 A1 | 7/2005 |
| EP | 0 957 026 B1 | 11/1999 |
| EP | 0 972 668 A2 | 1/2000 |
| EP | 1 099 630 A2 | 5/2001 |
| EP | 1543753 | 6/2005 |
| JP | 05-503980 | 6/1993 |
| JP | 2000-025696 A | 1/2000 |
| JP | 2001-334998 A | 12/2001 |
| JP | 2001334998 A * | 12/2001 |
| JP | 2004-248432 A | 9/2004 |
| RU | 2222863 C2 | 1/2004 |
| WO | 9210657 A1 | 6/1992 |

* cited by examiner

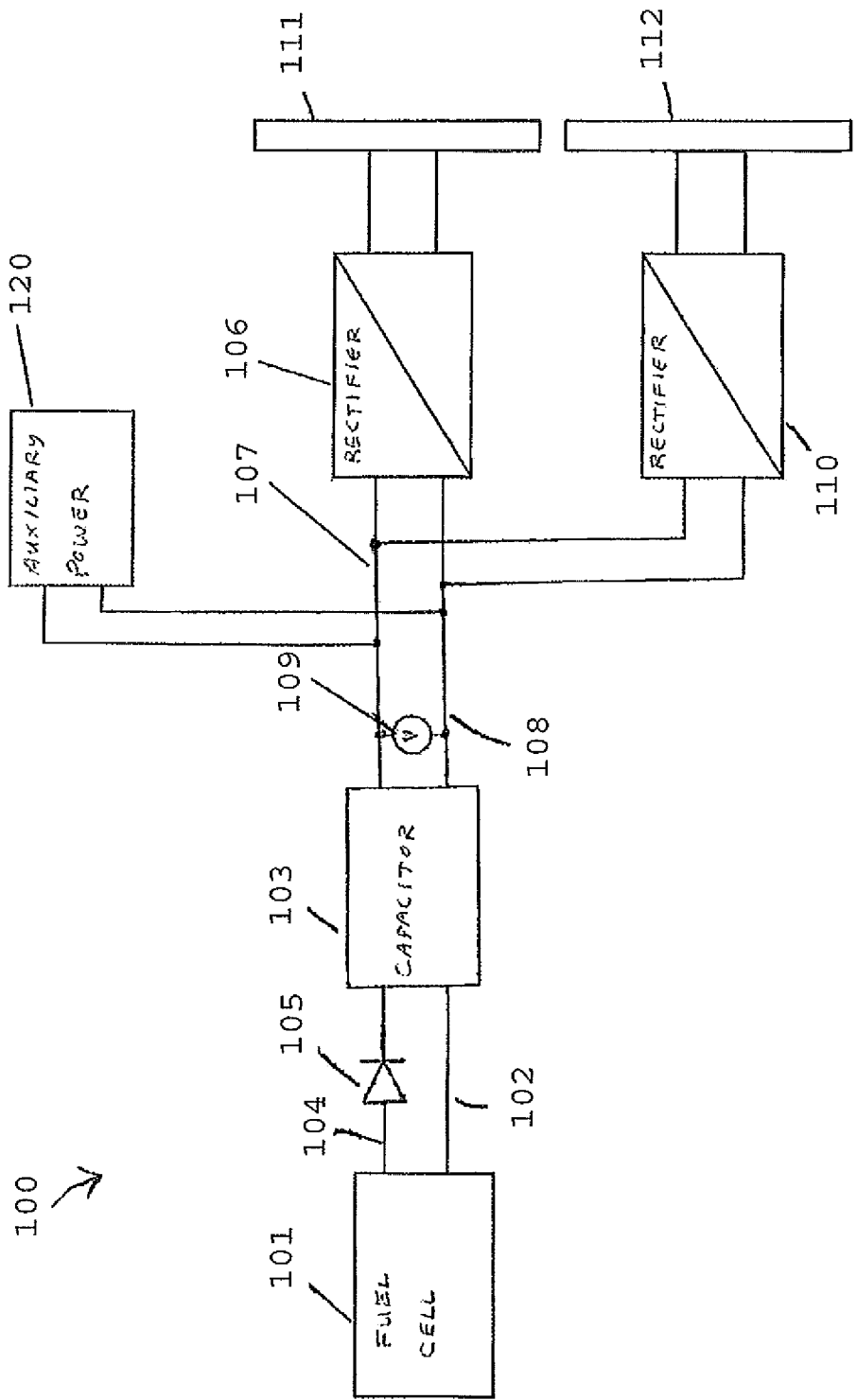

ENERGY SUPPLY SYSTEM FOR SUPPLYING ENERGY TO AIRCRAFT SYSTEMS

This application claims the benefit of the filing date of the German Patent Application No. 10 2005 046 729.6 filed Sep. 29, 2005 and of the U.S. Provisional Patent Application No. 60/721,638 filed Sep. 29, 2005, the disclosures of which are hereby incorporated herein by reference.

The present invention creates an energy supply system for supplying energy to aircraft systems, and a method for supplying energy to aircraft systems, in particular an energy supply system that comprises fuel cells and energy storage devices.

In present-day aircraft technology there are different bus systems, i.e. systems of electric lines, for aircraft electronics, which electric lines, for example, supply 28 V direct current or 115 V, 400 Hz alternating current to the aircraft. By means of these bus systems energy is supplied to a plurality of electrical loads. For example, opening cargo compartment doors of the aircraft is effected by means of devices that are supplied by means of the bus lines. These bus lines are fed by means of batteries. According to the actual aircraft architecture during the parking time or the so-called standby time, the batteries supply energy to various systems and/or devices within the aircraft, which systems and devices require electrical energy on a permanent basis. The standby time can last for several days. If the parking time exceeds two days, the batteries must be removed, and the aircraft must be connected to an external energy supply.

There may be a requirement to provide an efficient energy supply system for supplying energy to an aircraft.

According to an exemplary embodiment of the present invention, the above requirement is met by means of an energy supply system for an aircraft, wherein the energy supply system comprises at least one fuel cell and at least one energy storage device, and wherein the fuel cell, of which there is at least one, is coupled to the energy storage device, of which there is at least one, such that the energy storage device can be charged by means of the fuel cell.

According to an exemplary embodiment, in a method for operating an energy supply system in an aircraft, by means of a fuel cell electrical energy is provided, and the electrical energy provided is stored in an intermediate storage device.

A fundamental idea of the invention can be seen in the use of a fuel cell in an aircraft, which fuel cell charges an energy storage device or, in other words, an intermediate storage device. This may make it possible to buffer load peaks that are caused by systems of the aircraft, which systems are to be supplied with electrical energy, by means of the intermediate storage device or buffer storage device. It may thus be possible to do without batteries as a storage medium, i.e. as energy sources, or to relieve such batteries at least during standby times of aircraft. In particular, by using an energy supply system according to the invention it may be possible, in the case of pulsed operation, i.e. modulated operation, to prolong the supply time or parking time to an extended supply time of the aircraft systems to be supplied, because it may be possible to prevent permanent electrical loading of the batteries.

In this arrangement the fuel cell may be designed as an electrical and/or thermal energy supply source, which supplies electrical and/or thermal energy to electrical systems of the aircraft. By means of the energy storage device the energy supply system may store considerable electrical energy and supply this electrical energy over a brief period of time. In this way it may be possible to even out peaks in the consumption of electricity. At the end of the consumption peaks the energy storage device may be charged again by means of the fuel cell. In this way it may also be possible to design the supply of energy to the aircraft's systems to be supplied so that it is more efficient, because the intermediate energy storage device can be used as a buffer, as a result of which it may be possible to operate the fuel cell at a high level of efficiency or even at an optimal level of efficiency and to achieve an evening out of load peaks by means of the intermediate storage device. By operating the fuel cell at a high level of efficiency it may also be possible to reduce the overall energy consumption and to reduce the production of heat from the energy supply system.

With the system according to the invention it may also be possible to do without separate batteries, which are necessary for starting a possible so-called auxiliary power unit (APU). In the case of aircraft, such APUs may include gas turbines operated with kerosene, which gas turbines produce electrical and pneumatic energy. In addition, the APU may be operated in the case of malfunctions of various aircraft systems in order to take over or support the function of said aircraft systems. Furthermore, it may be possible for the energy supply system according to the invention, which energy supply system comprises a buffer storage device coupled to a fuel cell, to carry out the task of the batteries, at least in part. It may thus be possible to simplify the system, or to relieve the batteries, at least in part.

By means of the energy supply system according to the invention it may also be possible in any emergency situations of the aircraft to buffer energy requirements by means of the energy storage device, and thus to bridge a time span until a further emergency system is available. This may, in particular, be advantageous in the case of an aircraft travelling at low speed. In aircraft, usually a so-called ram air turbine is used as an emergency system, which ram air turbine, however, at low speed does not supply full power, so that it may not be possible to supply energy to all the electrical loads that are to be supplied with energy. If an energy supply system according to the invention is used, it may be possible to use this system as a buffer until the emergency system starts up and/or as a replacement for such an emergency system.

Further objectives, exemplary embodiments and advantages of the invention are stated in the further independent claims and in the dependent claims.

Below, exemplary embodiments of the energy supply system are described in more detail. The exemplary embodiments that are described in the context of the energy supply system also apply to the method, according to the invention, for operating an energy supply system, to an aircraft comprising an energy supply system, and to the use of an energy supply system in an aircraft.

In a further exemplary embodiment the energy supply system comprises a plurality of energy storage devices and/or a plurality of fuel cells.

By providing a plurality of fuel cells and/or energy storage devices it may be possible to efficiently match an output, which can be provided by means of the energy supply system, to the power requirements of electrical loads in the aircraft.

In another exemplary embodiment, the energy storage device, of which there is at least one, is a capacitor. The energy storage device, i.e. the intermediate storage device, can also be a battery.

Designing the energy storage device as a capacitor may be a particularly efficient way of providing a fast energy storage device. Such a capacitor may be suitable for storing very high electrical energy and for providing this energy within a short period of time. Such a capacitor may also be suitable, with the use of the energy supply system according to the invention in an aircraft, for supplying considerable electrical power to a Starter motor of an APU during the start-up phase of said APU. In this arrangement, the output voltage of the capacitor may depend directly on the charge quantity that is stored in the capacitor. If the charge quantity drops, the output voltage of the capacitor may drop. Such a drop may possibly be used as a control signal for starting to charge the intermediate storage device. If capacitors are used as intermediate storage devices, it may possibly be advantageous, when compared to the use of batteries as intermediate storage devices, that by means of capacitors it may be possible to simplify maintenance because capacitors may possibly have a longer service life than batteries. Furthermore, with the use of capacitors it may be possible to achieve shorter switching cycles than is the case with the use of batteries as intermediate storage devices.

In a further exemplary embodiment the energy supply system is designed as a passive system. The term "passive system" refers to the fuel cells and/or the energy storage devices, in particular capacitors, switching on automatically if electrical loads within the aircraft require peak output (demand peaks). Furthermore, the energy supply system can be designed such that in the case of insufficient voltage of the energy storage device, of which there is at least one, e.g. of a capacitor, the fuel cells switch on automatically in order to recharge the energy storage device, of which there is at least one.

Such recharging of the energy storage device with electrical energy, which is provided by the fuel cell, of which there is at least one, may make possible recharging with only little loss of energy. In particular it may also be possible to recover electrical energy from aircraft systems, i.e. from electrical loads in the aircraft. With such energy recovery it may be possible to improve the efficiency of the energy supply system and to reduce energy losses when supplying energy to the aircraft.

In another exemplary embodiment the energy supply system further comprises at least one inverted rectifier, and/or at least one rectifier. The inverted rectifier, of which there is at least one, and/or the rectifier, of which there is at least one, can be designed such that it converts electrical energy that can be provided by means of the fuel cell, of which there is at least one, and/or by means of the energy storage device, of which there is at least one. In particular, conversion can relate to voltage and/or to frequency.

Providing an inverted rectifier and/or a rectifier may be an efficient way of supplying different types of electrical power in relation to voltage and/or frequency to electrical loads within the aircraft. In other words, it may be possible to transform electrical power such that various electrical loads can be supplied. To this effect it can be advantageous to provide various bus systems by way of which the electrical power can be supplied at different voltage and/or frequency.

According to a further exemplary embodiment the energy supply system further comprises a control unit that is designed such that with it the energy storage device, of which there is at least one, is controlled such that with it demand peaks of electrical loads can be buffered.

In another exemplary embodiment the energy storage device, of which there is at least one, is designed such that with it electrical power can be provided to an auxiliary power unit.

Such provision of electrical power for an auxiliary power unit (APU), which can, for example, be a gas turbine, may in particular be an efficient way to provide energy, in particular in the start-up phase of the APU.

According to another exemplary embodiment the energy storage device is designed as a buffer storage device. In particular, the buffer storage device can be designed such that with it demand peaks of electrical loads in aircraft can be buffered. Such electrical loads can, in particular, be devices and auxiliary systems in an aircraft; however, this preferably does not relate to the engines of an aircraft.

Particularly advantageously, an energy supply system according to the invention may be used in an aircraft.

In summary, one aspect of the invention consists of the provision of an energy supply system that comprises a fuel cell and an energy storage device, wherein the fuel cell is designed such that with it the energy storage device is rechargeable. Such a buffer storage device may, for example, be a capacitor or a battery (accumulator). Furthermore, such an energy supply system may be usable in any aircraft, including for example, in a helicopter or in an airship.

In this arrangement a capacitor may be used to provide considerable electrical energy within a short period of time. When the quantity of the charge stored in the capacitor is reduced, the output voltage of the capacitor will also drop. If the output voltage drops below a specifiable voltage value, the capacitor may automatically be recharged by the fuel cell and/or by means of an electrical energy recovery system from electrical loads and/or from the on-board network.

A further case of application of the energy supply system may involve relieving and/or replacing batteries. In prior art such batteries are used in parked aircraft to serve as energy sources for starting auxiliary power units; such batteries can be replaced by the energy supply system according to the invention. By supporting or relieving the batteries by means of the energy supply system that comprises fuel cells in conjunction with an intermediate storage device, it may also be possible to extend parking times of aircraft. This may be possible because recharging of the capacitors by fuel cells is possible. Thus it may also be possible to simplify maintenance work, for example installing and deinstalling batteries as is required according to prior art, even in the case of extended standby times.

The energy supply system may also be able to be used for operating some of or all of the doors of the aircraft. In that permanent charging of the capacitor with electrical energy may be possible by means of the fuel cell, frequent opening of the doors or frequent carrying out of other functions on the aircraft may be possible even if the aircraft is parked.

An energy supply system according to the invention may also be used in an aircraft as a replacement and/or in support of a ram air turbine (RAT), which is an emergency system that is used if various faults occur. Such a RAT system comprises a swing-out arm with a propeller attached thereto, which propeller is driven by the relative wind created by the forward speed, thus being able to provide hydraulic and/or electrical energy for important emergency systems and avionics systems. RAT systems have a start-up time of approximately 5 seconds, which start-up time according to prior art is buffered by batteries so that trouble-free operation of various systems of the aircraft can be ensured. When compared to such a RAT system, an energy supply system according to the invention may provide an advantage in that it can provide full output even at low flight speeds, and can thus supply energy to all the electrical loads that have to be supplied. It may thus not be necessary to decouple some of the systems, e.g. slats and constant speed motors/generators, as it happens in prior art by means of a priority valve. In RAT systems according to prior art, such decoupling at low flight speeds is necessary because at low flight speeds the RAT system cannot supply sufficient energy to adequately or fully supply all the electrical loads to which energy has to be supplied.

In RAT systems according to prior art the priority valve decouples some of the electrical loads so that thereafter sufficient hydraulic energy is available again, for example to supply the aircraft's control system. In comparison to this, the energy supply system according to the invention may provide an advantage in that even at low speeds of the aircraft or with the aircraft at a standstill, said energy supply system according to the invention may provide adequate electrical and/or pneumatic energy, whereas a RAT system according to prior art comes to a halt if a certain minimum speed is not maintained, because the internal resistance of the hydraulic fluid becomes too great. Thus, an energy supply system according to the invention may be operative irrespective of the speed of the ram air that is used to drive the RAT system. The fuel cell may also be operated at low speeds, i.e. be permanently operated, and it may be possible to operate the fuel cell during all conditions of a flight in the full load range of the fuel cell.

It may also be possible to significantly reduce the start-up time of the RAT system with the use of the energy supply system according to the invention, i.e. for example in an energy supply system that comprises a fuel cell in conjunction with a capacitor. An energy supply system according to the invention may be suitable to assume the emergency function of the RAT system and to achieve a shorter start-up time when compared to a RAT system.

It should be pointed out that features or steps which have been described with reference to one of the above exemplary embodiments or with reference to one of the above aspects can also be used in combination with other features or steps of other exemplary embodiments or aspects described above.

Below, the invention is described in more detail by means of one exemplary embodiment with reference to the drawing.

FIG. 1 shows a diagrammatic view of an energy supply system according to one exemplary embodiment of the invention.

FIG. 1 shows a diagrammatic view of an energy supply system for supplying electrical power to electrical loads of an aircraft, according to an exemplary embodiment of the present invention. As shown in FIG. 1 the energy supply system 100 comprises a fuel cell 101, which by means of a first electrically conductive connection or line 102 is coupled to a capacitor 103. Further, the fuel cell 101 and the capacitor 103 are coupled by means of a second electrically conductive connection 104, in which a diode 105 is interconnected. Furthermore, the energy supply system 100 comprises an inverted rectifier 106, which, by means of a third electrically conductive line 107 and a fourth electrically conductive line 108, is coupled to the capacitor 103. A voltage meter 109 is coupled between the third electrically conductive connection 107 and the fourth electrically conductive line 108, which voltage meter 109 serves to determine the voltage that is provided by the capacitor 103.

Further, the energy supply system 100 comprises a rectifier 110 that is also coupled to the third electrically conductive line 107 and to the fourth electrically conductive line 108.

The inverted rectifier 106 is coupled to a first electrical bus 111, which provides alternating voltage to electrical loads, whereas the rectifier 110 is coupled to a second electrical bus 112, which provides direct voltage to electrical loads.

By means of the circuit that is diagrammatically shown in FIG. 1 it is possible to provide an energy supply system. In such an energy supply system the fuel cell 101 provides electrical energy to the capacitor 103, i.e. the fuel cell 101 is used to charge the capacitor 103. The capacitor 103 in turn can be used to buffer load peaks that occur as a result of electrical loads in an aircraft. In another exemplary embodiment the energy storage device, of which there is at least one, is designed such that with it electrical power can be provided to an auxiliary power unit 120. Such provision of electrical power for an auxiliary power unit (APU), which can, for example, be a gas turbine, may in particular be an efficient way to provide energy, in particular in the start-up phase of the APU.

In addition it should be pointed out that "comprising" does not exclude other elements or steps, and "a" or "one" does not exclude a plural number. Furthermore, it should be pointed out that features or steps which have been described with reference to one of the above exemplary embodiments can also be used in combination with other features or steps of other exemplary embodiments described above. Reference characters in the claims are not to be interpreted as a limitation.

The invention claimed is:

1. An energy supply system for energy supply of at least one consumer in an aircraft, the energy supply system comprising:
    at least one fuel cell;
    at least one electrical energy storage device; and
    at least one gas turbine serving as an auxiliary power unit for providing electrical power to consumers in the aircraft,
    wherein the at least one fuel cell is coupled to the at least one electrical energy storage device such that the at least one electrical energy storage device can be charged by the fuel cell,
    wherein the at least one electrical energy storage device is arranged as a buffer storage device between the at least one fuel cell and the at least one consumer, and
    wherein the electrical energy storage device is configured to provide electrical power to the gas turbine in a start-up phase of the gas turbine.

2. The energy supply system of claim 1,
    wherein said at least one electrical energy storage device is a plurality of electrical energy storage devices and said at least one fuel cell is a plurality of fuel cells.

3. The energy supply system of claim 1,
    wherein the at least one electrical energy storage device is a capacitor.

4. The energy supply system of claim 1,
    wherein the energy supply system is a passive system.

5. The energy supply system of claim 1, further comprising:
    at least one inverted rectifier or at least one rectifier.

6. The energy supply system of claim 5,
    wherein the at least one inverted rectifier or the at least one rectifier convert electrical energy provided by the at least one fuel cell or of the at least one electrical energy storage device.

7. The energy supply system of claim 6,
    wherein the conversion relates to voltage or to frequency.

8. The energy supply system of claim 1, further comprising:
    a control unit,
    wherein the control unit controls the at least one electrical energy storage device to buffer demand peaks of electrical loads generated by the consumers.

9. The energy supply system of claim 1,
    wherein the energy supply system is configured to charge the electrical energy storage device by an electrical energy recovery system from at least one of an electrical consumer load and an aircraft's on-board network.

10. A method comprising:
  using an energy supply system for energy supply of at least one consumer in an aircraft, the energy supply system comprising
    at least one fuel cell;
    at least one electrical energy storage device;
    at least one gas turbine serving as an auxiliary power unit for providing electrical power to consumers in the aircraft;
    wherein the at least one fuel cell is coupled to the at least one electrical energy storage device such that the at least one electrical energy storage device can be charged by the fuel cell, and
    wherein the at least one electrical energy storage device is arranged as a buffer storage device between the at least one fuel cell and the at least one consumer, and
    wherein the electrical energy storage device is configured to provide electrical power the gas turbine in a start-up phase of the gas turbine.

11. A method for operating an energy supply system in an aircraft, the method comprising:
  providing electrical energy by a fuel cell;
  storing the provided electrical energy in an intermediate storage device;
  providing electrical energy from the intermediate storage device to a gas turbine serving as an auxiliary power unit for providing electrical power to consumers in the aircraft during a start-up phase of the gas turbine.

* * * * *